Patented Oct. 3, 1933

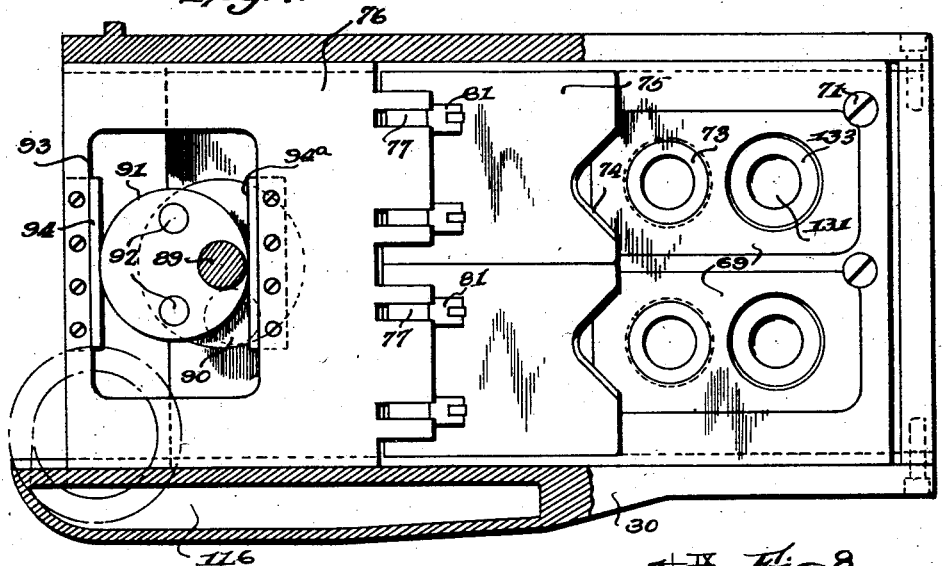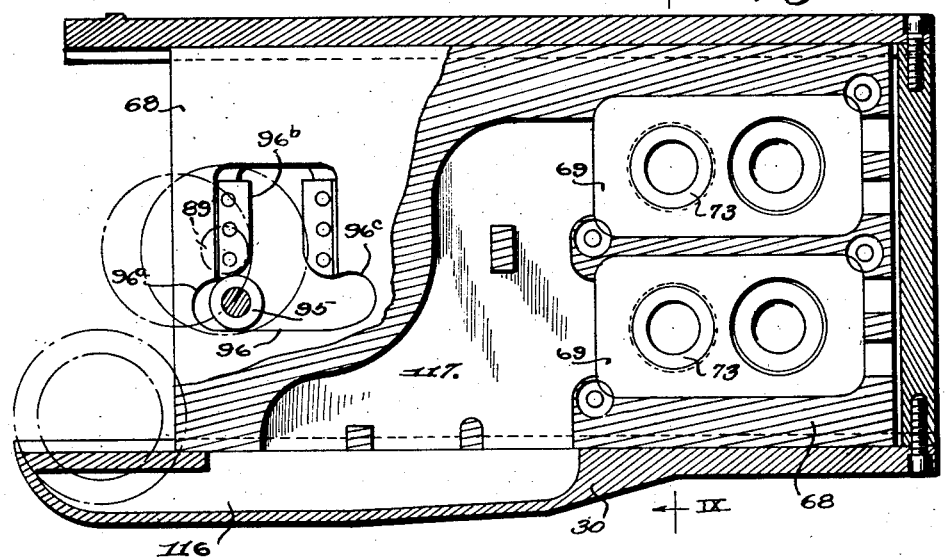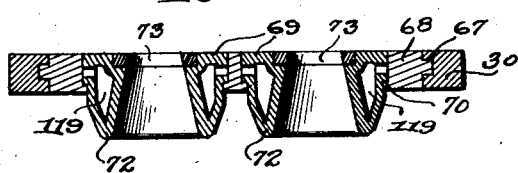

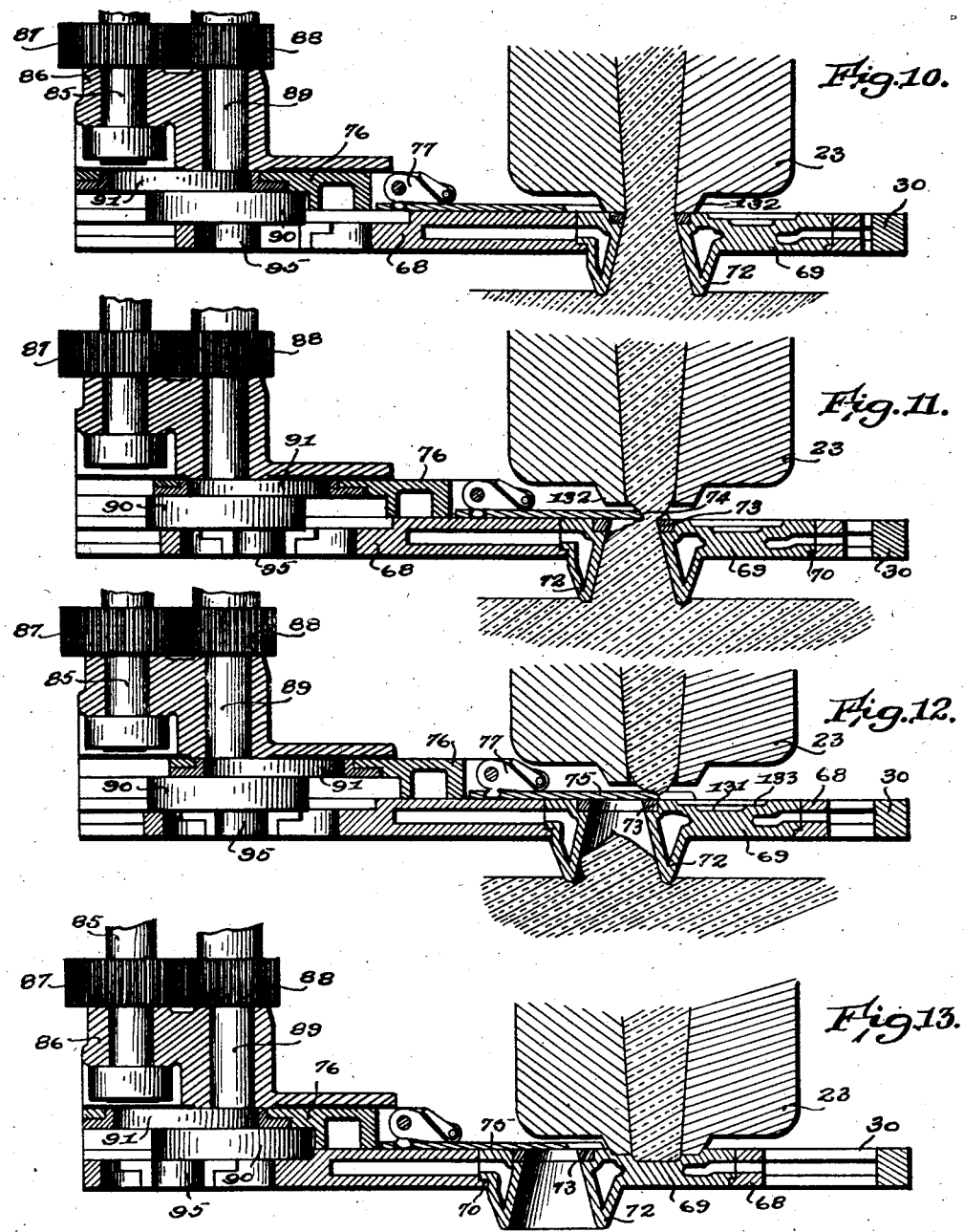

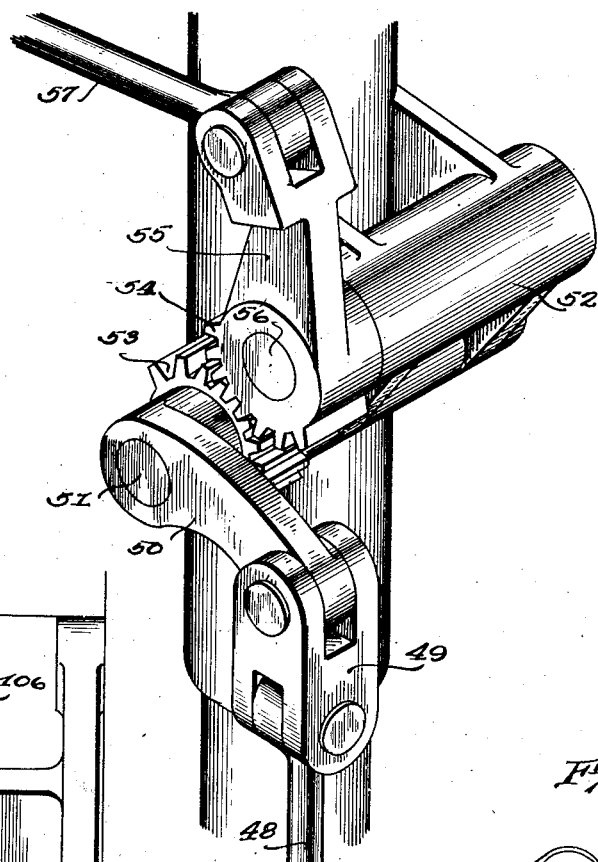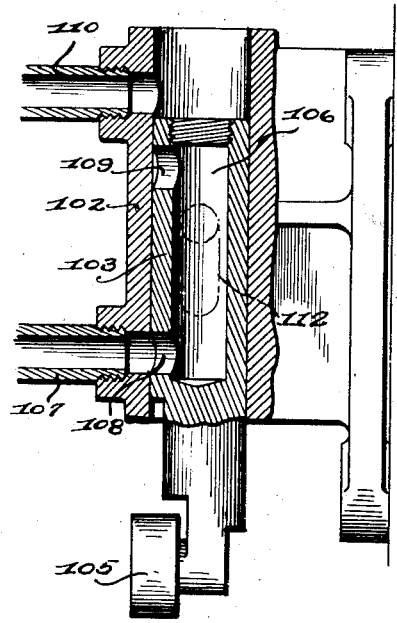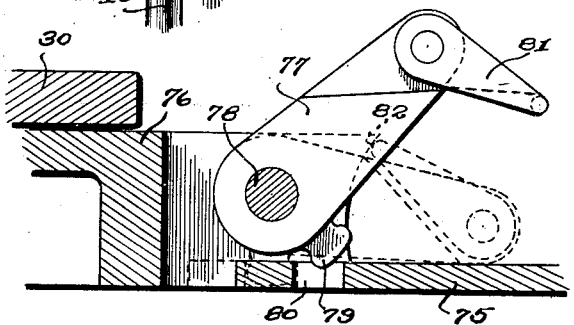

1,928,730

UNITED STATES PATENT OFFICE 1,928,730

MACHINE FOR FORMING GLASS ARTICLES

Garland Lufkin, Toledo, Ohio, and Russell G. Allen, Alton, Ill., assignors to Owens-Illinois Glass Company, a corporation of Ohio Application October 17, 1930. Serial No. 489,346

19 Claims. (Cl. 49—5)

Our invention relates to machines for forming glass articles, of the type in which the charges of glass are introduced by suction into forming molds. The invention has to do particularly with means for introducing the charges of glass into the molds and severing the glass between the molds and supply body.

In suction gathering machines the usual practice at the present time is to sever the glass by a knife which sweeps across the bottom of the mold after the latter has been filled with glass by suction and lifted from the supply body of glass. Considerable difficulty is often experienced in maintaining the cutting mechanism in good condition and adjusted in a manner to prevent the formation of an objectionable cut-off scar which appears as a defect in the finished ware. This defect is due in part to the excessive chilling of the glass in the angle formed at the meeting edge of the mold opening with the knife plate, and to the formation of fins of glass where the knife plate wipes across the edge of the mold cavity. This chilled glass is not reheated sufficiently to be remolded in the finishing mold and so appears as a defect in the blown article. Various other difficulties are encountered with the usual cutting mechanism. For example, the knife, unless kept in perfect adjustment, either fails to make a clean severance of the glass, or the knife edge strikes the mold each time the knife operates. This repeated striking quickly dulls the knife and defaces the mold, making necessary the reconditioning of the mold and knife at frequent intervals.

An object of the present invention is to overcome the above and other difficulties and objections present with the usual form of cutting mechanism, and to provide an efficient and practical construction by which objectionable cut-off scars are eliminated.

Other objects of the invention will appear hereinafter.

The invention in its preferred form, as herein illustrated, comprises a cutter plate interposed between the gathering mold and the supply body of molten glass during the gathering operation, said plate having an opening therethrough to register with the mold cavity and through which the glass is drawn by suction into the mold. After a charge is thus introduced into the mold, the mold and said plate are separated by a relative vertical movement and a knife is moved across the upper surface of said plate to shear the glass, said plate preferably also having a shearing movement in the opposite direction to that of the knife so that the severance takes place at or near the center line of the mold cavity.

In the accompanying drawings:

Figs. 7 and 8 are sectional plan views taken, respectively, at the planes of the lines VII—VII and VIII—VIII on Fig. 5.

Fig. 9 is a section at the line IX—IX on Fig. 8.

Figure 1:
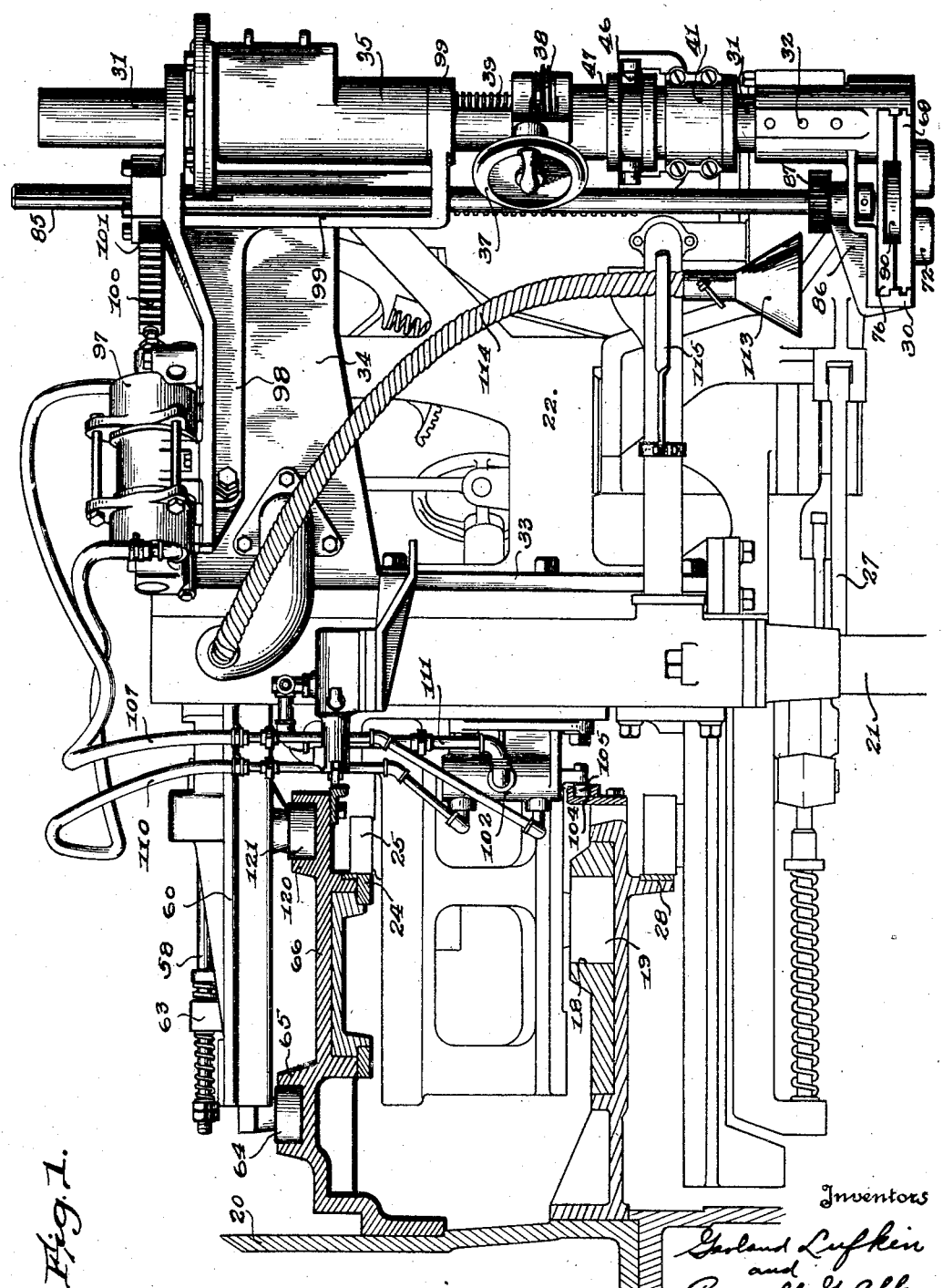
Fig. 1 is a part sectional side elevation view of an Owens type of suction gathering machine with the present invention applied thereto.

Figs. 10 to 13, inclusive, are sectional elevations showing a gathering mold and cutting apparatus and illustrating successive steps in the gathering, severing and formation of a parison in the mold. Fig. 10 shows the parts in the position assumed while a charge of glass is drawn into the mold.

Fig. 11 shows the relative position of parts at an intermediate point in the severing operation.

Fig. 12 shows the position of parts just after the severance of the glass is completed.

Fig. 13 shows the gathering and cutting plate lifted into engagement with the mold and the lower end of the parison formed in the bottom forming recess of said plate.

Fig. 14 is a detail perspective view of operating connections between the cutting mechanism and its lifting cam.

Fig. 15 is a sectional detail of a valve controlling the air motor which operates the cutters.

Fig. 16 is a detail view of a latch for locking a knife to its carrying frame.

Our invention, as illustrated in the accompanying drawings, is applied to an Owens type of suction gathering machine, such as shown, for example, in the patent to LaFrance 1,185,687, June 6, 1916. Such machine comprises a central stationary column 20 on which a mold carriage 21 is mounted for continuous rotation about the vertical axis of said column. Individual dip heads or units are carried on frames 22 supported on the mold carriage for rotation therewith, said frames and heads being mounted for up and down movement on the carriage for lifting and lowering the blank molds 23. In the construction herein shown are two blank molds 23 on each head or unit. The dip head frame 22 is lifted and lowered in the usual manner by means of a stationary cam 18 (Fig. 1) on which runs a roll 19 having the usual connections for lifting and lowering the frame. The plunger shaft 17 (Fig. 2) is lifted and lowered by a stationary cam 24 on which runs a cam roll 25 having the usual operating connections with the plunger shaft, the latter carrying plunger tips which enter the molds and form the initial blow openings in the parisons. Each blank mold 23 (Fig. 2) comprises horizontally separable sections carried on arms 26 having operating connections 27 (Fig. 1) with a stationary cam 28 for opening and closing the mold.

Figure 3:
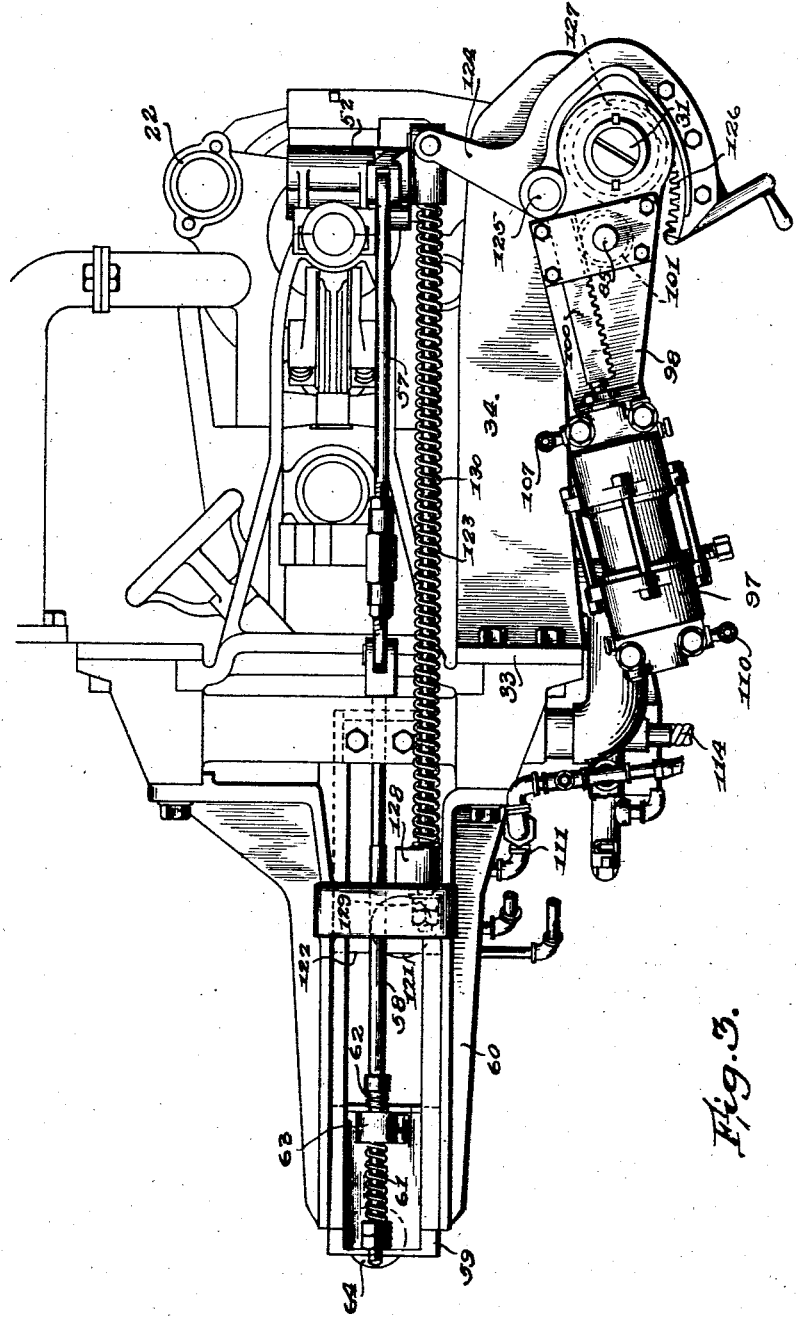
Fig. 3 is a top plan view.
Figure 4:
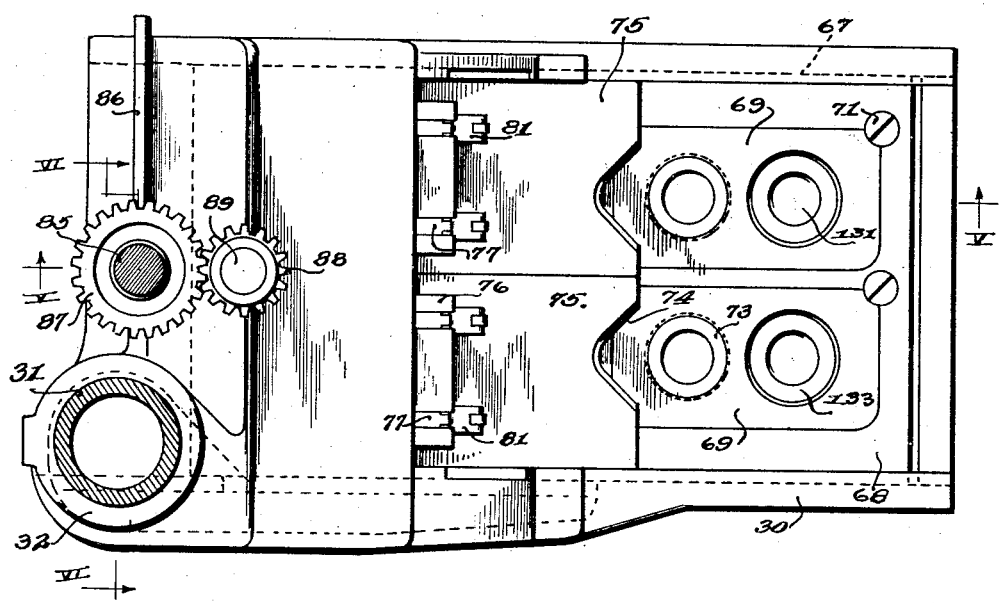
Fig. 4 is a sectional plan showing the cutters and their carrying frame.
Figure 5:
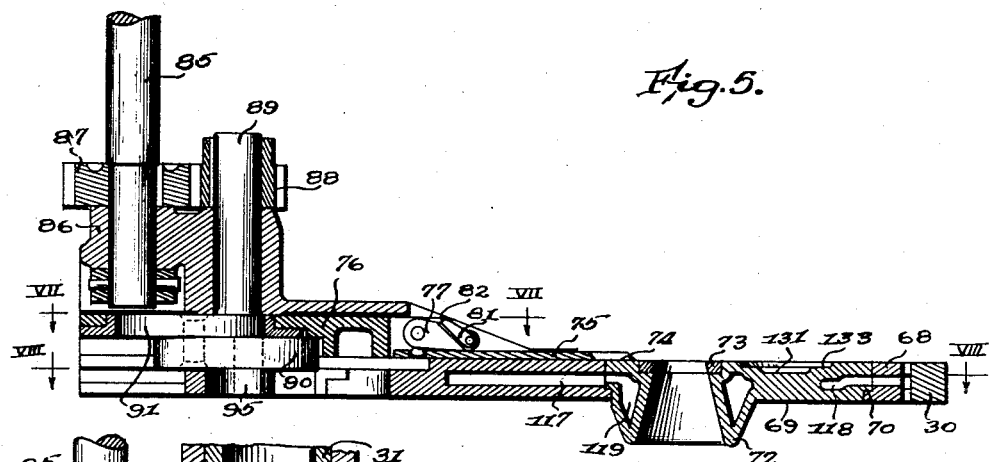
Fig. 5 is a sectional elevation of the same, the section being taken at the line V—V on Fig. 4.
Figure 6:
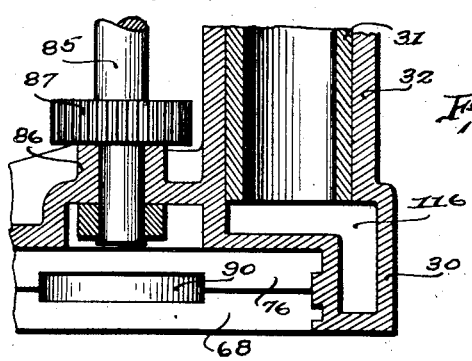
Fig. 6 is a section at the line VI—VI on Fig. 4.

The cutting mechanism includes slide plates mounted on a horizontally disposed rectangular cutter frame 30 attached to the lower end of a vertical tubular rock shaft 31 which is rocked by mechanism presently to be described, for swinging the frame 30 into and out of a position beneath the molds. The connection between the frame 30 and the rock shaft comprises a tubular extension 32 (Figs. 2, 4, and 6) formed integral with said frame to receive the lower end of the shaft 31. The shaft 31 is supported on the dip head frame 22. A vertically disposed frame 33 (Figs. 1, 2, and 3) is secured to the dip head frame and is formed adjacent its upper end with a horizontal arm 34, to the outer end of which is attached a vertical bearing sleeve 35 through which the shaft 31 extends.

Figure 2:
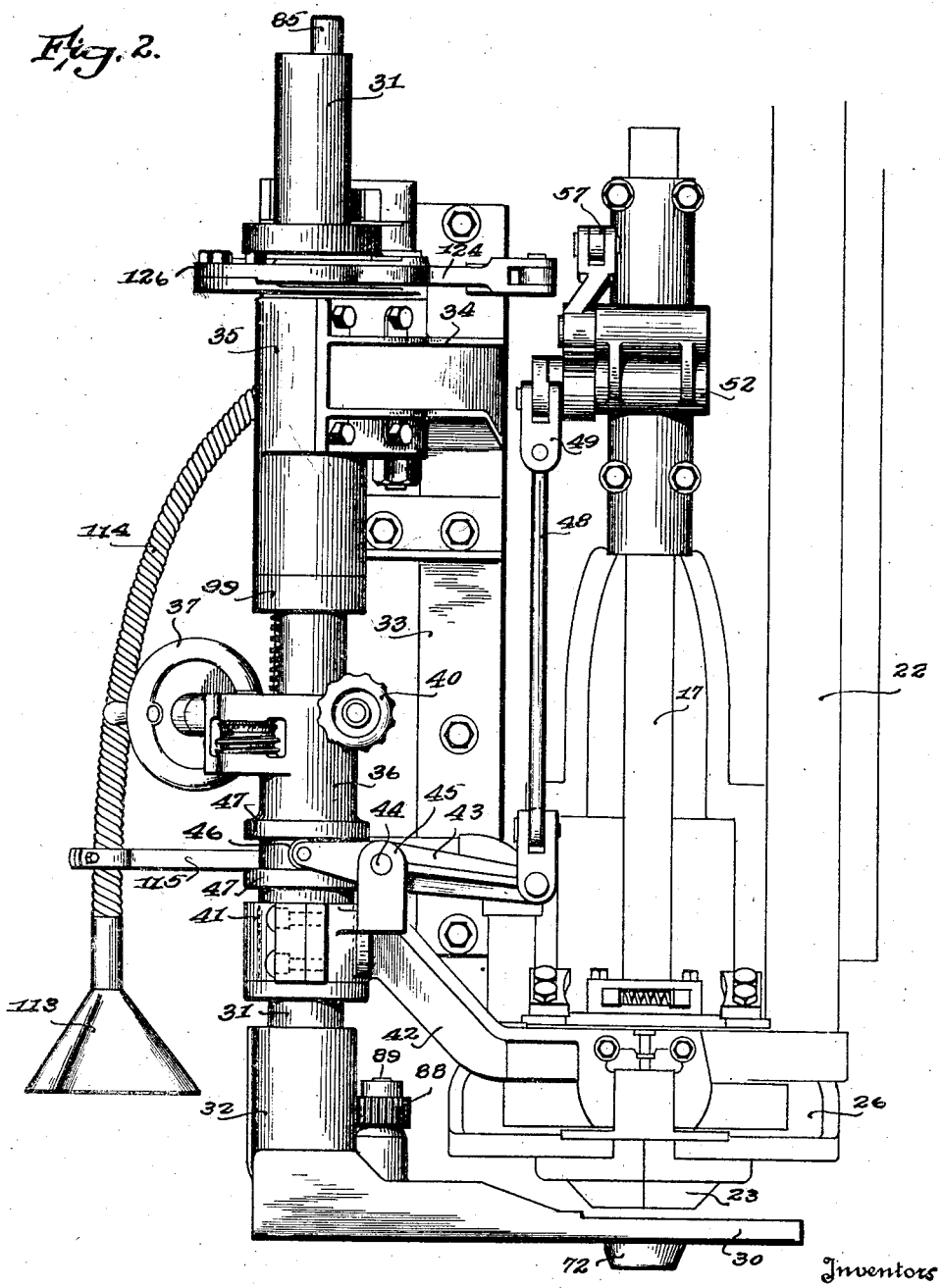
Fig. 2 is a front elevation of the same.

Below the bearing 35 is a tubular member or sleeve 36 which surrounds the shaft 31 and is adjustable up and down thereon. Means for effecting such adjustment comprises a hand wheel 37 geared to a worm 38 journaled in the member 36, said worm running in mesh with rack teeth 39 formed on the shaft 31. The sleeve 36 is preferably split so that it can be clamped in adjusted position on the shaft by means of a hand wheel 40 (Fig. 2). The member 36 is journaled in a bearing sleeve 41 on an arm 42 on the dip head frame.

The rock shaft 31 is periodically moved up and down for lifting and lowering the frame 30 and cutting mechanism carried thereby. Such up and down movement is effected by mechanism including a lever 43 (Fig. 2) fulcrumed at 44 on a bracket arm 45 forming an extension of the arm 42. The lever 43 carries a roll 46 running in an annular groove formed by flanges 47 on the sleeve 36. The lever 43 is connected through a rod 48 and head 49 (see Fig. 14) to the outer end of a rock arm 50 fixed to a rock shaft 51 journaled in a bearing box 52 carried on the dip head frame 22. Fixed to the shaft 51 is a gear pinion 53 meshing with a segmental gear 54 formed on a rock arm 55 secured to a rock shaft 56 journaled in the bearing box 52. A horizontally disposed rod 57 (see Fig. 3) connects the rock arm 55 with the inner end of a horizontal rod 58. The latter is connected to a slide block 59 mounted to reciprocate radially of the machine in horizontal guides formed on arms 60 mounted on the mold carriage and extending radially of the machine. The rod 58 preferably has a yielding connection with the slide block, such connection comprising springs 61 and 62 mounted on the rod on opposite sides of a lug 63 on the slide block, through which lug the rod 58 extends freely. The slide block 59 carries a roll 64 which runs on a stationary cam 65 formed on a cam plate 66 fixed to the center column 20 of the machine. The shape of the cam 65 is such that it operates through the connections above described to periodically lift and lower the rock shaft 31 and cutting mechanism carried thereby, as hereinafter set forth.

The cutter frame 30 is formed with guideways 67 in which a slide plate 68 is mounted to reciprocate lengthwise of the frame. A pair of funnel carrying plates 69 are removably supported in the slide plate 68, the latter being provided with openings to receive the plates 69. The plate 68 is formed with shoulders or flanges 70 extending along the rims of said opening and on which the plates 69 are seated. Screws 71 (Fig. 7) removably hold the funnel plates in position. Gathering funnels 72 which may be formed integral with the plates 69 extend downward from said plates and provide passageways through which the glass enters the molds. The upper end of each funnel may comprise a ring 73 of hardened material providing a shearing edge which cooperates with the cutting edges 74 of knife plates or blades 75.

These knife plates are removably attached to a slide plate 76 mounted in the frame 30 for reciprocation lengthwise of said frame. The slide 76 is preferably in a plane just above that of the slide 68. The knife plates 75 are removably connected to the slide 76 by connecting devices (Fig. 16), each including an arm 77 connected by a pivot 78 to the slide 76, said arm carrying a lug 79 which fits in an opening 80 formed in the knife plate 75. When the arm 77 is swung up, the lug 79 is carried out of the opening 80, permitting the knife to be removed. When the arm 77 is swung down to hold the knife plate, it is locked in such position by a latch 81 pivoted to the arm, the latch being swung back to engage a shoulder 82 on the plate 76. This mechanism provides a convenient means for quickly removing or replacing the knife plates. It also serves as a means for holding the cutting edge of the knife down firmly against the cooperating plate during the cutting stroke. This will be apparent when it is considered that the resistance of the glass to the forward movement of the knife causes a backward pressure on the lug 79, which is transmitted through the arm 77, so that its forward end bears down on the knife plate with a pressure proportional to said resistance. During the return stroke the pull of the knife on the lug 79 is in a forward direction tending to swing the lever 77 up, thus removing the pressure from the knife plate. The shoulder 82 prevents more than a slight upward swing of the lever 77.

The mechanism for actuating the cutters will now be described. Referring to Figs. 1 and 4 to 8, a vertical shaft 85 is supported on the cutter frame 30 and has a journal bearing adjacent its lower end in a bearing block 86 which forms a part of the frame 30. A gear 87 keyed to the shaft 85 runs in mesh with a pinion 88 keyed to a short shaft 89 also journaled in the bearing block 86. Fixed to the lower end of the shaft 89 or forming a part thereof is a disk 90. A disk 91 eccentric to the shaft 89 is secured to the disk 90 by rivets 92. The eccentric disk 91 is positioned in a rectangular opening 93 formed in the slide 76 to which the knives 75 are attached. Bearing plates 94 and 94a of hardened steel or other suitable material are attached to the slide plate 76 and extend along the sides of the opening 93 in position to engage the periphery of the eccentric 91. Attached to the disk 90, on the under side thereof and eccentric to the shaft 89, is a cam roll 95 which runs in an opening 96 formed in the lower slide 68. When the shaft 89 is rotated, the eccentric 91 operates to reciprocate the slide 76 and knives 75. At the same time, the lower slide 68 carrying the gathering funnels 72 is reciprocated by the eccentric 95, the two slides moving simultaneously in opposite directions for severing the glass, as hereinafter more fully explained.

The shaft 85 is rotated by an air operated piston motor 97 (Figs. 1 and 3) mounted on an arm 98 forming part of a frame 99 fixed to the rock shaft 31. The motor piston is connected to a rack 100 which runs in mesh with a pinion 101 splined on the shaft 85. The supply of air under pressure to the motor 97 is controlled by a valve 103 in a valve casing 102 (Figs. 1 and 15). The valve is reciprocated vertically by means of a stationary cam 104 engaging a cam roll 105 on the valve 103. The valve is formed with an air pressure chamber 106 which, when the valve is in its lowered position (Fig. 15), communicates with an air line 107 through a port 108. When the valve in its uppermost position, the pressure chamber 106 communicates through a port 109 with an air line 110. When the valve is in an intermediate position, both air lines are cut off from said chamber. Air under pressure is constantly supplied to said chamber through a pipe line 111 opening into the chamber through an elongated port 112. The air lines 107 and 110 lead to opposite ends of the piston motor 97.

Means for blowing cooling air on the frame 30 comprises a funnel 113 on the lower end of a flexible air pipe 114 having connection with the usual low pressure air system employed in the present type of machine. An adjustable arm 115 provides support for the funnel in any desired position of adjustment.

Cooling air is also circulated through the lower slide plate 68 and the funnel guide plates 69 thereon. This air is supplied through the hollow shaft 31, the lower end of which opens into a chamber 116 (Figs. 6 and 8) formed in the frame 30. The chamber 116 communicates with an air chamber 117 formed in the slide plate 68 and the chamber or air passageway 117 in turn communicates with a chamber or passageway 118 which is formed in the funnel plate 69. The air passage 118 opens into a cooling chamber 119 which surrounds the gathering funnels and through which the air circulates. The cooling air conducted downward through the hollow shaft 31 enters the chamber 116 and from thence flows through the passageways 117 and 118 and is exhausted to the atmosphere at the outer end of the slide plate 68.

The rock shaft 31 and parts carried thereby, including the cutter frame 30 and arm 98 on which the cutter operating motor 97 is mounted, are periodically rocked by means of a stationary cam 120 (Fig. 1) on the cam plate 66. A roll 121 running on said cam is carried by a slide block 122 (Fig. 3) mounted to slide radially of the machine. The slide block is connected through a rod 123 with one arm of a lever 124 pivoted at 125 on the frame 34. The other arm of said lever is formed with an arc shaped rack 126 concentric with the pivot 125. Said rack engages rack teeth 127 on the rock shaft 31. The connection between the rod 123 and the slide block 122 comprises a lug 128 formed on said block through which the rod freely extends. A nut 129 threaded on the end of said rod provides means for adjusting the angular position of the rock shaft 31. A coil spring 130 provides a yielding connection between the lever 124 and the slide block. By rocking the shaft 31, the cutter frame 30 may be swung from an operative position beneath the mold to a position at one side of the mold where it will not interfere with the opening and closing movements of the mold and will also provide clearance permitting the finishing mold (not shown) to be swung up in the usual manner for enclosing the parison.

The operation is as follows:

The mold carriage 21 is rotated continuously and brings the blank mold heads or units in succession to a gathering position with the molds 23 thereon over the tank or pool of molten glass. The blank molds swing closed as they approach the gathering position. The shaft 31 is rocked by means of the cam 120 (Fig. 1) operating through rod 123 (Fig. 3) and lever 124, to swing the cutter frame 30 and cutting mechanism thereon from a position at one side of the molds to a position directly beneath the molds, such swinging movement taking place in synchronism with the mold closing movement. The cutter frame 30 during this swinging movement is spaced below the molds in its knife drop position. After this swinging movement the frame 30 is lowered so that the gathering funnels 72 dip into the molten glass. During this lowering of the frame 30, the dip head carrying the molds is also lowered, the downward movement of the molds being at a higher speed than that of the frame 30 so that the molds overtake said frame.

The molds are now in sealing contact with the gathering funnels 72 and the latter in sealing contact with the pool of glass. Glass is drawn by section into and fills the mold cavities in the usual manner. The dip head then commences to move upward out of dip, carrying with it the blank molds while the suction continues. During this initial upward movement of the molds, the gathering funnels remain in their lowered position in contact with the glass. This relative movement of the molds and funnels is controlled by the cam 65 (Fig. 1) which operates through the connections heretofore described to lower the frame 30 relative to the molds. The gathering head after being lifted a short distance so as to leave a space between the molds and cutters, dwells for a short interval to permit the cutting operation. The lifting of the molds from the gathering funnels, causes a contraction or necking-in of the glass between the funnel and the mold because of the downward pull of the glass in the funnel which tends to run back into the supply body while the glass which fills the mold cavity is retained by suction.

The air motor 97 (Fig. 1) is now actuated to effect the shearing operation. This operation of the motor is controlled by the cam 104 which lifts the valve 102 (Fig. 15) to connect the pipe line 110 with air pressure so that the motor piston is advanced and through the rack 100 and pinion 101, rotates the shaft 85 in a clockwise direction through a sufficient angle to rotate the pinion 88 (Fig. 5) through one complete rotation in a counterclockwise direction. This imparts a complete rotation to the eccentrics 91 and 95 about the axis of the shaft 89, the parts at the commencement of such movement being substantially in the positions shown in Figs. 7 and 8. The eccentric 91 during the first half of its rotation advances the knife plates 75 through their cutting stroke. At the commencement of this movement, the roll 95 travels idly along a clearance path 96ᵃ formed in the opening 96 so that the funnel plates 69 remain at rest. After the knife plates have been advanced to bring the cutting edges 74 close to the funnels, the roll 95 engaging the upper portion of the wear plate 96b moves the slide 68 and funnel plates to the left or in the direction opposite to that in which the knife plates 75 are moving, so that both the knife plates 75 and the shearing rings 73 operate to shear the glass. This operation is indicated in Fig. 11, in which the knife edge 74 and the shearing ring 73 have commenced to shear the glass. The cutting edges meet substantially in line with the center of the mold cavity, as indicated in Fig. 12, which shows the position of the cutters just after the severing operation has been completed. The knife plate 75 remains in its advanced position where it forms a support for the tip of the severed glass which depends from the mold, while the funnel plate 69 continues its forward movement and thereby brings a bottom cup or cavity 131 formed in the plate 69, directly beneath and in register with the mold cavity. The knife plate is now withdrawn by the movement of the eccentric 91 during the latter half of its rotation. The roll 95 during the final portion of its rotation about the shaft 89 travels idly along the clearance path 96c.

The movements of the cutters are rapid, the entire cutting operation taking place in a fraction of a second. Owing to the forward travel of the gathering funnels relative to the pool of glass during the cutting operation, the glass in the funnels runs back into the supply body under the combined influence of gravity and the pull on the glass due to the movement of the funnels relative to the supply body of glass. After the severing operation, as above described, has been completed, the gathering head resumes its upward movement. At the same time, the frame 30 is moved upward at a higher speed and overtakes the blank molds. The glass protruding from the mold cavities is by this movement forced into the recesses 131. The parts are now in the position shown in Fig. 13. When the mold 23 and plate 69 are thus brought together, compressed air is admitted to the mold in the usual manner to compress the blank. The mold is provided with an extension 132 having a tapered annular peripheral surface which seats in a correspondingly shaped recess 133 in the plate 69 when said plate and mold are brought together. This construction provides a means for centering the plate 69 with the cup cavity 131 in register with the mold cavity (Fig. 13). After the parisons have been formed in the blank molds, the cutter frame 30 is lowered relative to the molds and swung through an angle of 120 degrees, more or less, to a position between the dip heads, permitting the blank mold to open and the finishing mold to be brought up for enclosing the blank. The cutter frame is returned to its position beneath the molds at any convenient point during the rotation of the mold carriage before the gathering position is again reached. The motor 97 is also actuated at any convenient point to retract the rack 100, thereby imparting a complete rotation to the eccentrics 90 and 91 in a clockwise direction (the reverse of that above described), thereby restoring the cutter mechanism to the position shown in Figs. 7 and 8.

Modifications may be resorted to within the spirit and scope of our invention.

What we claim is:

1. The combination of a suction gathering mold, a glass gathering device interposed between the mold and a supply body of molten glass, said device providing a passageway from the supply body to the mold cavity through which the glass enters the mold, said device having a shearing edge, a shear blade, and means for simultaneously moving said device and the shear blade in opposite directions transversely of the mold cavity and causing their shearing edges during said movement to meet at or near the center line of the mold cavity.

2. The combination of a suction gathering mold having a downwardly opening mold cavity, a gathering device beneath the mold formed with a passageway in register with the mold cavity, means for bringing the mold and gathering device into a gathering position in which said device is in contact with a supply body of molten glass, permitting a charge of glass to be drawn by suction through said device into the mold, means for moving the mold upward away from the gathering device and thereby necking in the glass between said device and the mold, a cutter, and means for moving the cutter across and in shearing contact with the gathering device in a plane between the gathering device and the mold and thereby severing the neck of glass at a plane spaced below the mold.

3. The combination of a suction gathering mold having a downwardly opening mold cavity, a gathering device beneath the mold formed with a passageway in register with the mold cavity, means for bringing the mold and gathering device into a gathering position in which said device is in sealing contact with a supply body of molten glass and with the mold, permitting a charge of glass to be drawn by suction through said device into the mold, means for separating the mold and gathering device by a relative vertical movement, means for causing a relative horizontal movement of the gathering device and supply body of glass, while said device is spaced below the mold whereby a downward force is applied to the glass in the gathering device, and means for severing the glass between the spaced gathering device and mold at a plane spaced below the mold.

4. The combination of a mold, a cutter plate having an opening therethrough in register with the mold cavity, means for bringing said mold and plate into operative relation to a supply body of molten glass and causing a charge of glass to enter the mold by suction through said opening, means for separating the mold and said plate, a cutter blade and means for moving said blade across said plate in shearing contact therewith in a plane between said plate and the mold to shear the glass after the mold and said plate are separated.

5. The combination of a suction gathering mold having a downwardly opening mold cavity, a frame beneath the mold, a plate mounted on said frame, said plate having an opening therethrough to register with the mold cavity and permit molten glass to pass through said opening into the mold, means for separating said plate and mold by a relative vertical movement of the plate and mold, a cutter, means for operating the cutter between said plate and the mold, said plate being formed with a recess located wholly at one side of said opening while said opening is in register with the mold cavity, means for moving said plate laterally relative to the mold and thereby moving said opening to one side of the mold cavity and bringing said recess beneath the mold cavity, and means for causing a relative vertical movement of the mold and said plate to bring the plate 6. The combination of a suction gathering mold having a downwardly opening mold cavity, a frame beneath the mold, a plate mounted on said frame, said plate having an opening therethrough to register with the mold cavity and permit molten glass to pass through said opening into the mold, means for separating said plate and mold by a relative vertical movement of the plate and mold, a cutter, means for operating the cutter between said plate and the mold, said plate being formed with a recess located wholly at one side of said opening while said opening is in register with the mold cavity, means for moving said plate laterally relative to the mold and thereby moving said opening to one side of the mold cavity and bringing said recess beneath the mold cavity, and means for causing a relative vertical movement of the mold and said plate to bring the plate into sealing engagement with the mold, with said recess in register with the mold cavity, said mold having a downwardly projecting portion formed with tapered walls and said plate having correspondingly tapered surfaces arranged to engage said walls and align said recess with the mold cavity.

7. The combination of a rock shaft, a cutter frame carried thereby, a mold, means for rocking said shaft and thereby swinging the cutter frame about the axis of said shaft into and out of operative relation to the mold, cutters mounted to reciprocate on said frame, and eccentrics individual to said cutters, said eccentrics being carried by said frame and operable to reciprocate the cutters.

8. The combination of a mold, a mold bottom plate, a knife plate, means for moving the knife plate across the bottom of the mold to sever a charge of glass and into a position to support the glass in the mold, means for moving said bottom plate into position beneath the mold and knife plate while the knife plate is retained in said glass supporting position, means for then withdrawing the knife plate while the bottom plate is retained beneath the mold, and means for bringing the bottom plate and mold together after the knife plate is withdrawn.

9. The combination of a mold having a downwardly opening cavity into which glass is introduced by suction, a knife plate, means for moving the knife plate transversely beneath the mold to sever the glass and into a position to support the severed glass in the mold, a bottom plate, means for moving the bottom plate transversely of the mold to a position beneath the mold and knife plate while the latter is retained in said glass supporting position, means for withdrawing the knife plate while the bottom plate is retained beneath the mold, and means for bringing said bottom plate into sealing contact with the mold after the knife is withdrawn.

10. The combination of a mold having a downwardly opening cavity into which glass is introduced by suction, a knife plate, means for moving the knife plate transversely beneath the mold to sever the glass and into a position to support the severed glass in the mold, a bottom plate, means for moving the bottom plate transversely of the mold to a position beneath the mold and knife plate while the latter is retained in said glass supporting position, means for withdrawing the knife plate while the bottom plate is retained beneath the mold, and means for bringing said bottom plate into sealing contact with the mold after the knife is withdrawn, said bottom plate having a bottom forming recess in its upper face brought into alignment with the mold cavity by said transverse movement of the bottom plate.

11. The combination of a suction gathering mold having a downwardly opening mold cavity, a plate beneath the mold having a gathering opening therethrough in register with the mold cavity, means for causing a charge of glass to enter the mold cavity through said opening, means for then separating said plate and mold by a relative vertical movement, a cutter, means for moving said cutter transversely between the mold and said plate for severing the glass, means for moving said plate transversely of the mold to move said gathering opening to one side of the mold cavity, means for withdrawing the cutter, and means for moving said plate into engagement with the mold to form a bottom for the mold cavity.

12. In glass forming apparatus, the combination of a mold, means for causing a movement of glass from a supply body into the mold, means for severing the glass between the mold and supply body comprising a plate provided with a cutting edge, a reciprocating slide, a cutter plate connected to said slide, means to reciprocate the slide and thereby cause the cutting edges to sever the glass, and automatic means to cause said cutter plate to bear against said first mentioned plate with a pressure substantially proportional to the resistance of the glass to the movement of the cutter plate during the severing operation.

13. In apparatus for severing molten glass, the combination of a cutter, a horizontally reciprocating element, a rock arm pivoted to said element and having a connection with the cutter at a point beneath its pivot, a cooperating plate beneath said cutter and provided with a shearing edge cooperating with the edge of said cutter, and means for reciprocating said element and causing said arm to exert a downward pressure on the cutter proportional to the resistance of the glass to the forward movement thereof.

14. In apparatus for severing molten glass, the combination of a reciprocating slide, a cutter blade, and means connecting the blade and slide comprising a lever pivoted to the slide above said blade and extending forwardly over the blade, said lever and blade being formed with interlocking surfaces by which the blade is connected to move with the slide and by which resistance to the forward movement of the blade causes said lever to bear down on the blade with a pressure corresponding to said resistance.

15. In apparatus for severing molten glass, the combination of a reciprocating slide, a cutter blade, means connecting the blade and slide comprising a lever pivoted to the slide above said blade and extending forwardly over the blade, said lever and blade being formed with interlocking surfaces by which the blade is connected to move with the slide and by which resistance to the forward movement of the blade causes said lever to bear down on the blade with a pressure corresponding to said resistance, and a latch connected to said lever, said slide being provided with a holding surface to engage said latch.

16. The combination of a mold, means for introducing a charge of glass into the mold, means for severing the glass comprising overlapping shearing elements, and automatic means operable during the glass severing movement of said elements to cause them to bear against each other with a pressure substantially proportional to the resistance offered by the glass to the forward movement of one of said elements.

17. The combination of a suction gathering mold, a cutter frame beneath the mold, plates overlying one another and mounted for horizontal reciprocating movement on said frame, cutters attached to said plates, a vertical shaft on said frame, means for rotating the shaft, and eccentrics on the shaft individual to said plates, said plates having openings therein through which the shaft extends, said eccentrics arranged to engage the walls of said openings and reciprocate said plates and cutters.

18. The combination of a suction gathering mold, a cutter frame beneath the mold, plates overlying one another and mounted for horizontal reciprocating movement on said frame, cutters attached to said plates, a vertical shaft on said frame, means for rotating the shaft, and eccentrics on the shaft individual to said plates, said plates having openings therein through which the shaft extends, said eccentrics arranged to engage the walls of said openings and reciprocate said plates and cutters, said eccentrics and engaging walls being so arranged that during one portion of the cutting stroke one of the cutters remains stationary relative to said frame, while the other cutter advances, and during a subsequent portion of the cutting stroke both cutters are advanced concomitantly in opposite directions.

19. The combination of a suction gathering mold, a cutter frame, means for swinging said frame horizontally into and out of position beneath the mold, a pair of plates overlying one another and mounted for horizontal, straight line reciprocating movement on said frame, cutters carried by said plates, a vertical shaft mounted for rotation on said frame, and eccentrics carried by said shaft and engaging said plates for reciprocating said plates and cutters.

GARLAND LUFKIN.
RUSSELL G. ALLEN.